N. M. HOPKINS.
DYNAMOMETER THERMO-COUPLE FOR EXPLOSION ENGINES.
APPLICATION FILED JULY 28, 1908.
935,154.
Patented Sept. 28, 1909.
3 SHEETS—SHEET 1.
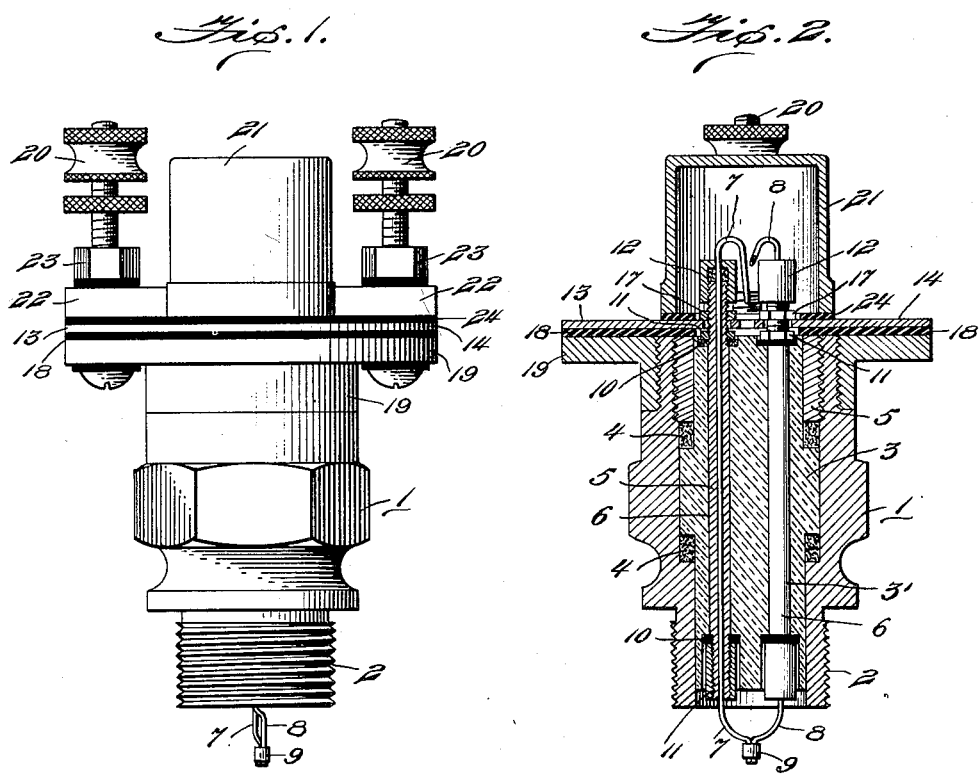
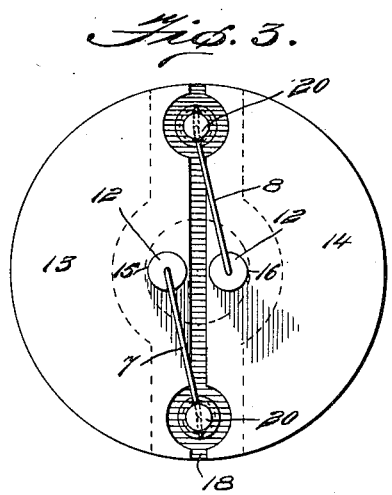
Witnesses
B. M. Offutt.
N. P. Leonard.
Inventor
Nevil Monroe Hopkins,
By Byrnes, Townsend & Brickenden
Attys.

N. M. HOPKINS.
DYNAMOMETER THERMO-COUPLE FOR EXPLOSION ENGINES.
APPLICATION FILED JULY 28, 1908.
935,154.
Patented Sept. 28, 1909.
3 SHEETS—SHEET 2.
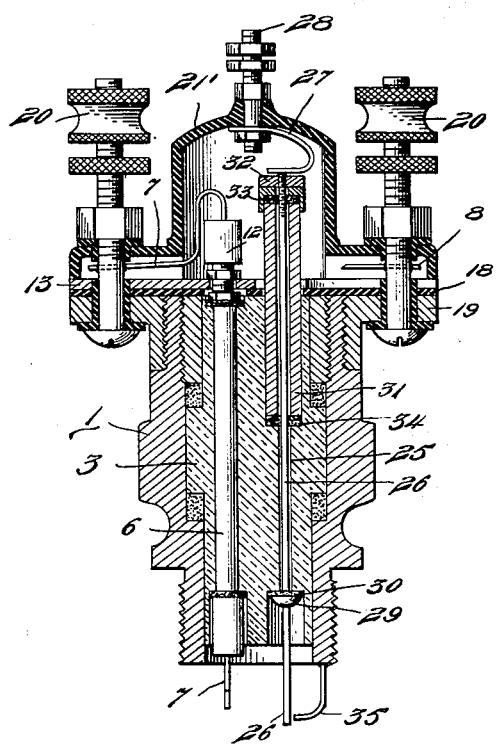
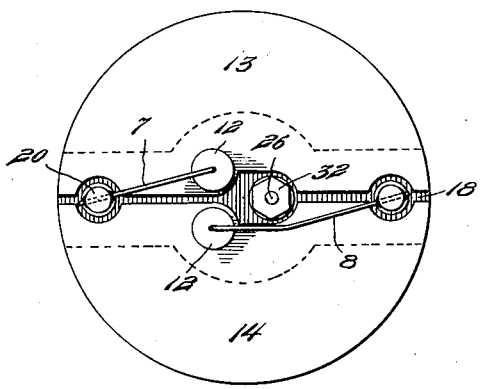
Witnesses,
Inventor,
Nevil Monroe Hopkins,
By Byrnes, Townsend & Brickenstein,
Attys.

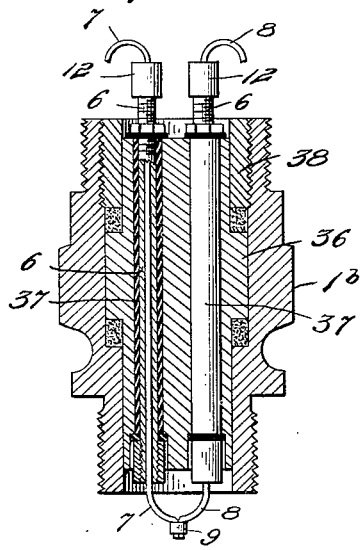
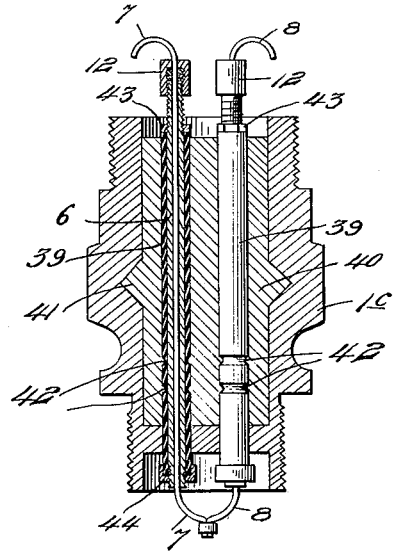
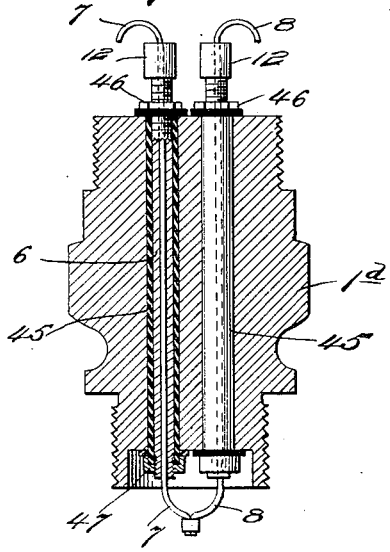

UNITED STATES PATENT OFFICE.

NEVIL MONROE HOPKINS, OF WASHINGTON, DISTRICT OF COLUMBIA.

DYNAMOMETER THERMO-COUPLE FOR EXPLOSION-ENGINES.

935,154.  Specification of Letters Patent.  Patented Sept. 28, 1909.

Application filed July 28, 1908. Serial No. 445,823.

*To all whom it may concern:*

Be it known that I, NEVIL MONROE HOPKINS, a citizen of the United States, residing at Washington, in the District of Columbia, have invented certain new and useful Improvements in Dynamometer Thermo-Couples for Explosion-Engines, of which the following is a specification.

In my United States Letters Patent 903,090, granted November 3, 1908, I have described and claimed a dynamometer for explosion-engines comprising a heat-responsive device located in the engine-cylinder or in proximity to the point of gas-ignition, specifically a thermo-couple, and a dynamometric indicator, specifically a milli-volt meter arranged at a convenient point and electrically connected to the thermo-couple.

The present invention comprises specific improvements in thermo-couples adapted for use in the specified combination.

Referring to the accompanying drawings: Figures 1, 2 and 3 are respectively a side elevation, a transverse vertical section, and a plan view, with the top removed, of one type of thermo-couple; Figs. 4 and 5 are respectively a transverse vertical section and a plan view, with the top removed, of a fitting similar to that shown in the preceding figures, but containing both a thermo-couple and a gas-ignition device; and Figs. 6, 7 and 8 are transverse vertical sections of three other types of fittings carrying thermo-couples only.

The device shown in Figs. 1, 2 and 3 comprises a metal body 1 having a threaded lower end 2 or other means for providing a gas-tight joint with the engine-cylinder. The body is bored and counterbored to receive a bushing 3 of refractory insulating material such as porcelain. A gas-tight joint between the body and bushing is secured by asbestos washers 4, a threaded ring 5 screwing into the upper end of the body 1 and bearing on the upper washer. The porcelain bushing has two parallel longitudinal holes 3' which receive closely-fitting massive copper tubes 6, through which pass the wires 7, 8, of the thermo-couple. These wires may consist respectively of iron and German silver, and are brazed or otherwise secured together at their adjacent lower ends to provide the heat-receptive junction. Their ends may be inclosed by a collar 9 to provide a secure joint. Gas-tight joints between the copper tubes 6 and the porcelain bushing are secured by asbestos washers 10, compressed by nuts 11 threaded on the ends of the tubes. The wires 7, 8 are longitudinally adjustable within the copper tubes, gas-tight joints between the wires and tubes being secured by stuffing-boxes 12 at their upper ends having compressible packings. The wires are adjusted by sliding them through the tubes, after loosening the packings.

In order that various thermo-couples may be interchangeably used with different millivolt meters having identical scales, it is necessary that these thermo-couples should be so constructed as to receive and dissipate precisely the same amount of heat from the explosion-gases. The amount of heat received is dependent on the length of those portions of the wires 7, 8 projecting into the cylinder and exposed to the gases. The provision for the longitudinal adjustment and predetermined extent of exposure of the wires enables all thermo-couples to be quickly standardized. It is moreover vitally important that the rate of heat-dissipation from the wires 7, 8 should be such as to maintain their junction at a temperature below the ignition-point of the gas-mixture supplied to the engine. A portion of the heat received by the wires passes from the thick-walled copper tubes 6 laterally through the porcelain bushing 3 to the metal body 1 and thence to the engine-cylinder. This outflow of heat through the insulation may be sufficient, and serviceable devices have been built in which the required low temperature of the junction is thus maintained. It is usually preferred, however, to provide supplemental heat-dissipating surfaces. In the present instrument, such surfaces are supplied by two semi-circular brass plates 13, 14, having adjacent openings 15, 16 receiving the upper ends of the copper tubes 6. These plates are clamped between nuts 17, threaded on the upper ends of the copper tubes, and layers of insulation 18 which rest on the upper end of the body 1 and on a flanged metal support-piece 19 threaded thereon. The heat flows freely from the wires 7, 8, through the nuts 17 and the plates 13, 14. The major portion of the upper surfaces of these plates is exposed to the air, whereby they are kept relatively cool. The free ends of the wires 7, 8 extend through and are soldered to the insulated metal stems of binding-posts 20, which receive the leads placing the thermo-couple in electrical connection with the milli-volt meter. These leads should consist of wires of the same metals, respectively, as those of the thermo-couple, in order that there may be no seat of electromotive force at the binding-posts, which in use are at a temperature higher than that of the atmosphere. The upper ends of the copper tubes and their stuffing-boxes are protected by a cap 21 having oppositely disposed lugs 22, clamped beneath nuts 23 of the binding-posts. This cap, if of metal, is separated from the brass plates 13, 14 by a layer of insulation 24.

The device shown in Figs. 4 and 5 is identical with that shown in Figs. 1, 2, 3, except that the porcelain bushing 3 is provided with a third longitudinal opening 25, receiving a wire 26 which constitutes one spark-electrode and is electrically connected at its upper end, by a spring 27 and binding-post 28, to the spark-coil or other source of electric current. This electrode-wire has a shoulder 29 seated against an asbestos washer 30. A porcelain tube 31 surrounds the upper end of the wire, entering the upper enlarged portion of the passage 25, and is clamped by a nut 32, threaded on its upper end, between asbestos washers 33, 34. These three washers provide gas-tight joints. The other spark-electrode is a wire 35 projecting from the lower end of the body 1. A cap 21' of vulcanized fiber or other insulating material incloses the upper ends of the wires and insulating tubes.

Fig. 6 shows a modified construction in which the metal body 1ᵇ receives a shouldered metal bushing 36. The copper tubes are insulated from the metal bushing by porcelain tubes 37, which, being relatively thin, permit the ready outflow of heat from the thermo-couple wires. Gas-tight joints are provided by asbestos washers clamped between the ends of the porcelain tubes and nuts threaded on the ends of the copper tubes. Gas-tight joints between the metal bushing 36 and the body 1 are secured by asbestos washers compressed by a ring 38 threaded into the upper end of the body.

In the modified construction shown in Fig. 7, the copper tubes 6 are surrounded by insulating tubes 39, and a filling 40 of lead is cast into the body 1ᶜ and around the insulating tubes, entering an internal groove 41 in the body and external grooves 42 in the insulating tubes, thereby providing a support and gas-tight joint for the tubes. The tubes 39 are clamped between upper nuts 43 and asbestos washers and lower nuts 44, the nuts threaded on the opposite ends of the copper tubes 6.

Fig. 8 shows a modification in which the metal body 1ᵈ directly receives insulating tubes 45 containing the copper tubes 6. Gas-tight joints are provided between the ends of the tubes 45 and the body by asbestos washers compressed by nuts 46, 47 threaded on the upper and lower ends of the copper tubes 6.

The metal fittings shown in Figs. 6, 7, 8, are designed to receive the same support-piece, insulation, binding-posts and cap as that shown in Figs. 1, 2, 3, the brass radiating-plates 13, 14 being optional.

I claim:

1. In combination, a support, thermo-couple wires, and metal tubes within and insulated from said support and receiving said wires.

2. In combination, a support, thermo-couple wires, metal tubes within and insulated from said support and receiving said wires, and a heat-radiating plate secured to the upper end of each tube.

3. In combination, a support, and thermo-couple wires having their ends united to provide a heat-receptive junction, said wires being longitudinally adjustable in said support and exposing a variable length to the source of heat.

4. In combination, a metal body, and insulated thermo-couple wires having their ends united to provide a heat-receptive junction, said wires being longitudinally adjustable in said body and exposing a variable length to the source of heat.

5. In combination, a metal body, insulated thermo-couple wires having their ends united to provide a heat-receptive junction, said wires being longitudinally adjustable in said body and exposing a variable length to the source of heat, and stuffing-boxes receiving the outer ends of said wires.

6. In combination, a support, thermo-couple wires, metal tubes within and insulated from said support and having stuffing-boxes receiving said wires, and a heat-radiating plate secured to the upper end of each tube.

7. In combination, a metal body, an insulating bushing in said body, having longitudinal openings, metal tubes in said openings, compressible washers, and nuts, on the ends of said tubes, and thermo-couple wires extending through said tubes.

8. In combination, a metal body, an insulating bushing in said body, having three longitudinal openings, thermo-couple wires extending through two of said openings, an insulating tube seated in the third opening, and a spark-electrode extending through said third opening and tube.

9. A thermo-couple, comprising wires having joined ends, and metal tubes closely fitting the wires, leaving the juncture exposed.

10. A thermo-couple, comprising wires having joined ends, and metal tubes adjustably receiving the wires, leaving the juncture exposed.

11. In combination, an insulating bushing having longitudinal openings, metal tubes in said openings, abutments on one end of each tube, compressible washers between the abutments and the ends of the tubes, nuts at the other ends of the tubes, and thermocouple wires extending through the tubes.

In testimony whereof, I affix my signature in presence of two witnesses.

NEVIL MONROE HOPKINS.

Witnesses:
EUGENE A. BYRNES,
JOS. H. BLACKWOOD.